(12) United States Patent
Oohara et al.

(10) Patent No.: US 11,149,611 B2
(45) Date of Patent: Oct. 19, 2021

(54) EXHAUST PURIFICATION UNIT

(71) Applicant: ISUZU MOTORS LIMITED, Tokyo (JP)

(72) Inventors: Isao Oohara, Yokohama (JP); Katsushi Osada, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/562,878

(22) PCT Filed: Mar. 29, 2016

(86) PCT No.: PCT/JP2016/060217
§ 371 (c)(1),
(2) Date: Sep. 28, 2017

(87) PCT Pub. No.: WO2016/158993
PCT Pub. Date: Oct. 6, 2016

(65) Prior Publication Data
US 2018/0112571 A1    Apr. 26, 2018

(30) Foreign Application Priority Data

Mar. 30, 2015 (JP) .............................. JP2015-068050
Apr. 20, 2015 (JP) .............................. JP2015-085716

(51) Int. Cl.
*F01N 3/20* (2006.01)
*B01D 53/94* (2006.01)
(Continued)

(52) U.S. Cl.
CPC ............ *F01N 3/208* (2013.01); *B01D 53/94* (2013.01); *F01N 3/08* (2013.01); *F01N 3/2066* (2013.01);
(Continued)

(58) Field of Classification Search
CPC . B01D 53/94; F01N 2240/20; F01N 2240/40; F01N 2610/02; F01N 3/08;
(Continued)

(56) References Cited

U.S. PATENT DOCUMENTS

| | | | |
|---|---|---|---|
| 8,991,160 B2 * | 3/2015 | Katou | F01N 3/106 60/295 |
| 9,410,464 B2 * | 8/2016 | Hicks | F01N 3/2066 |

(Continued)

FOREIGN PATENT DOCUMENTS

| | | |
|---|---|---|
| DE | 102014205782 | 12/2014 |
| EP | 2128398 A1 | 12/2009 |

(Continued)

OTHER PUBLICATIONS

JP 2013-245677 (Dec. 2013) machine translation.*
(Continued)

*Primary Examiner* — Phutthiwat Wongwian
*Assistant Examiner* — Diem T Tran
(74) *Attorney, Agent, or Firm* — Procopio, Cory, Hargreaves & Savitch LLP

(57) ABSTRACT

An exhaust purification unit includes: a connecting pipe transmitting exhaust gas to a selective reduction catalyst (SCR); a urea water injection valve arranged to face an exhaust upstream end of the connecting pipe and injecting urea water into the connecting pipe; a mixer chamber forming a flow path along which exhaust gas flows from an exhaust downstream end of a front stage casing and turns back to the exhaust upstream end of the connecting pipe; and a flow adjustment member provided in the mixer chamber, being a member having a truncated-cone shape which extends from a vicinity of the injection opening of the urea water injection valve towards the connecting pipe with a diameter thereof gradually increasing, in which a plurality of
(Continued)

small holes is formed, and in which a claw that guides the exhaust gas towards the exhaust downstream-side is provided for each of the plurality of small holes.

8 Claims, 9 Drawing Sheets

(51) Int. Cl.
  *F01N 3/24* (2006.01)
  *F01N 3/08* (2006.01)
  *F01N 3/28* (2006.01)
(52) U.S. Cl.
  CPC .............. *F01N 3/24* (2013.01); *F01N 3/2892* (2013.01); *F01N 2240/20* (2013.01); *F01N 2240/40* (2013.01); *F01N 2610/02* (2013.01); *Y02T 10/12* (2013.01)
(58) Field of Classification Search
  CPC .......... F01N 3/2066; F01N 3/208; F01N 3/24; F01N 3/2892; Y02T 10/12; Y02T 10/02
  USPC .................................. 60/286, 301, 303, 324
  See application file for complete search history.

(56) References Cited

U.S. PATENT DOCUMENTS

| | | | |
|---|---|---|---|
| 9,435,240 B2* | 9/2016 | Sampath | F01N 3/206 |
| 9,915,185 B2* | 3/2018 | Denis | F01N 5/025 |
| 2003/0079467 A1* | 5/2003 | Liu | B01F 3/04049 |
| | | | 60/286 |
| 2006/0218902 A1* | 10/2006 | Arellano | F01N 3/025 |
| | | | 60/295 |
| 2007/0101703 A1 | 5/2007 | Kanaya et al. | |
| 2008/0216470 A1* | 9/2008 | Sedlacek | F01N 13/08 |
| | | | 60/324 |
| 2009/0255242 A1* | 10/2009 | Paterson | B01F 3/02 |
| | | | 60/320 |
| 2009/0313979 A1* | 12/2009 | Kowada | B01D 53/9431 |
| | | | 60/297 |
| 2010/0018188 A1 | 1/2010 | Torisaka et al. | |
| 2011/0061374 A1* | 3/2011 | Noritake | F01N 3/035 |
| | | | 60/286 |
| 2011/0113759 A1* | 5/2011 | Tilinski | F01N 3/2066 |
| | | | 60/295 |
| 2012/0322012 A1 | 12/2012 | Tsumagari et al. | |
| 2013/0064725 A1 | 3/2013 | Kageyama et al. | |
| 2013/0164181 A1 | 6/2013 | Iijima et al. | |
| 2013/0167516 A1* | 7/2013 | Loman | F01N 3/2892 |
| | | | 60/319 |
| 2014/0325967 A1* | 11/2014 | Kimura | F01N 3/2066 |
| | | | 60/286 |
| 2015/0040537 A1 | 2/2015 | Hicks et al. | |
| 2015/0135683 A1* | 5/2015 | Petry | F01N 3/2066 |
| | | | 60/286 |
| 2015/0218996 A1* | 8/2015 | Brandl | B01F 5/0473 |
| | | | 60/295 |
| 2015/0275734 A1 | 10/2015 | Ohara et al. | |

FOREIGN PATENT DOCUMENTS

| | | | |
|---|---|---|---|
| EP | 2465602 A2 | 6/2012 | |
| JP | S62228615 A | 10/1987 | |
| JP | 20060029233 A | 2/2006 | |
| JP | 2008215286 A | 9/2008 | |
| JP | 20090036109 A | 2/2009 | |
| JP | 20090114930 A | 5/2009 | |
| JP | 2011185493 A | 9/2011 | |
| JP | 2011247128 A | 12/2011 | |
| JP | 20130133775 A | 7/2013 | |
| JP | 20130136991 A | 7/2013 | |
| JP | 2013-245677 | * | 12/2013 |
| JP | 2013245677 A | 12/2013 | |
| JP | 2014084850 A | 5/2014 | |
| JP | 2014234815 A | 12/2014 | |
| WO | 2009060599 | 5/2009 | |
| WO | 2014-167355 A1 | 10/2014 | |

OTHER PUBLICATIONS

International Search Report and Written Opinion for related PCT application No. PCT/JP2016/060217 dated Jun. 7, 2016.
Extended European Search Report for related EP App No. 16772874.0 dated Jul. 30, 2018, 7 pgs.
Office Action for related CN App No. 201680019151.9 dated Feb. 19, 2019, 13 pgs.
Decision of Refusal for related JP App No. 2015-068050 dated Apr. 2, 2019, 6 pgs.
Notification of Reasons for Refusal for related JP App No. 2015-085716 dated Apr. 2, 2019, 6 pgs.
Second Office Action for related CN App No. 201680019151.9 dated Aug. 23, 2019, 15 pgs.
Third Office Action for CN App No. CN-OA 201680019151.9 dated Dec. 10, 2019, 17 pages.
Notice of Reasons for Refusal for JP App No. 2015-085716 dated Nov. 12, 2019, 7 pages.
Decision to Decline the Amendment for JP App. No. 2015085716 dated Jun. 23, 2020. English translation provided; 6 pages.

* cited by examiner

EXHAUST PURIFICATION UNIT

CROSS-REFERENCE TO RELATED APPLICATIONS

This application is a U.S. National Stage entry of PCT Application No. PCT/JP2016/060217, filed on Mar. 29, 2016, which claims priority to Japanese Patent Application Nos. 2015-068050, filed Mar. 30, 2015 and 2015-085716, filed Apr. 20, 2015, the contents of which are incorporated herein by reference.

TECHNICAL FIELD

The present invention relates to an exhaust purification unit having an SCR catalyst.

BACKGROUND ART

As an exhaust purification unit reducing and purifying a nitrogen compound (NOx) in exhaust emitted from an internal combustion engine, there has been known an exhaust purification unit which includes a front stage part having a filter trapping particulate matters (hereinafter, referred to as 'PM') in an oxidation catalyst and the exhaust and a rear stage part having a selective reduction catalyst (hereinafter, referred to as 'SCR catalyst') purifying the nitrogen compound (hereinafter, referred to as 'NOx') in the exhaust by using ammonia, which is generated from urea water, as a reducing agent (for example, refer to Patent Documents 1 and 2).

In the exhaust purification unit disclosed in Patent Document 1, a front stage casing that accommodates therein the oxidation catalyst and the filter and a rear stage casing that accommodates therein the SCR catalyst are arranged in parallel, and an upstream end and a downstream end of a linear pipe arranged therebetween are respectively connected to an exit of the front stage casing and an entry of the rear stage casing. A urea water injection device is arranged at the upstream end of the pipe, so that urea water is added to exhaust gas introduced into the rear stage casing from the front stage casing, and the urea water is hydrolyzed to generate ammonia in the exhaust gas, the ammonia is supplied to the SCR catalyst, as a reducing agent, and NOx in the exhaust gas is thus reduced and purified.

In the exhaust purification unit disclosed in Patent Document 2, a swirl flow generation fin that swirls the exhaust gas is provided at a further upstream side than an injection position of the urea water, and the exhaust gas, which is a swirl flow, and the injected urea water are mixed in the pipe.

PRIOR ART REFERENCE

Patent Document

Patent Document 1: JP-A-2009-36109
Patent Document 2: JP-A-2006-29233

DISCLOSURE OF THE INVENTION

Problems to be Solved

While the urea water is injected from a vicinity of the upstream end of the pipe towards a downstream-side, the exhaust gas is introduced from the front stage casing into the upstream end of the pipe while intersecting with the flow of the exhaust gas. For this reason, a part of the injected urea water flows along a wall surface of an upstream part of the pipe and is attached thereto by the exhaust gas before it diffuses. As a result, a hydrolysis efficiency of the urea water is lowered and diffusivity of ammonia in the exhaust gas supplied to the SCR catalyst is deteriorated, so that an exhaust gas purification capacity of the SCR catalyst is lowered.

An exhaust purification unit of the disclosure is to increase a hydrolysis efficiency of urea water and to improve diffusivity of ammonia in an exhaust gas, thereby improving an exhaust gas purification capacity of a catalyst.

Means for Solving the Problems

An exhaust purification unit of the disclosure includes a selective reduction catalyst provided in an exhaust system of an internal combustion engine and selectively reducing a nitrogen oxide in exhaust by using ammonia as a reducing agent; an exhaust pipe transmitting exhaust gas to the selective reduction catalyst, a urea water injection device arranged to face an exhaust upstream end of the exhaust pipe and injecting urea water into the exhaust pipe; a chamber connecting an exhaust downstream end of a casing that accommodates therein a catalyst and the exhaust upstream end of the exhaust pipe, forming a flow path along which the exhaust gas flows from the casing and turns back to the exhaust pipe; and a flow adjustment member provided in the chamber, being a pipe material having a truncated-cone shape which extends from a vicinity of an injection port of the urea water injection device towards the exhaust pipe with a diameter thereof gradually increasing, in which a plurality of ventilation holes is formed, and in which a guide that guides the exhaust gas towards an exhaust downstream-side is provided for each of the plurality of ventilation holes.

Also, an exhaust purification unit of the disclosure includes a selective reduction catalyst provided in an exhaust system of an internal combustion engine and selectively reducing a nitrogen oxide in exhaust by using ammonia as a reducing agent; an exhaust pipe transmitting exhaust gas to the selective reduction catalyst; a urea water injection device injecting urea water into the exhaust pipe; and an exhaust introduction part connected to the exhaust pipe and having a plurality of ventilation holes formed therein, wherein the exhaust pipe includes an inner pipe to which the urea water is injected from the urea water injection device and an outer pipe forming a double pipe structure together with the inner pipe and a flow path of the exhaust gas is formed inside the inner pipe and between the inner pipe and the outer pipe, and wherein the exhaust introduction part is connected to an exhaust upstream end of the inner pipe and is formed to have a truncated-cone shape which extends from a vicinity of an injection port of the urea water injection device to the exhaust upstream end of the inner pipe with a diameter thereof gradually increasing.

Advantageous Effects of Invention

According to the exhaust purification unit of the disclosure, it is possible to increase a hydrolysis efficiency of the urea water and to improve diffusivity of ammonia in the exhaust gas, thereby improving an exhaust gas purification capacity of the catalyst.

MODE FOR CARRYING OUT THE INVENTION

Figure 1:
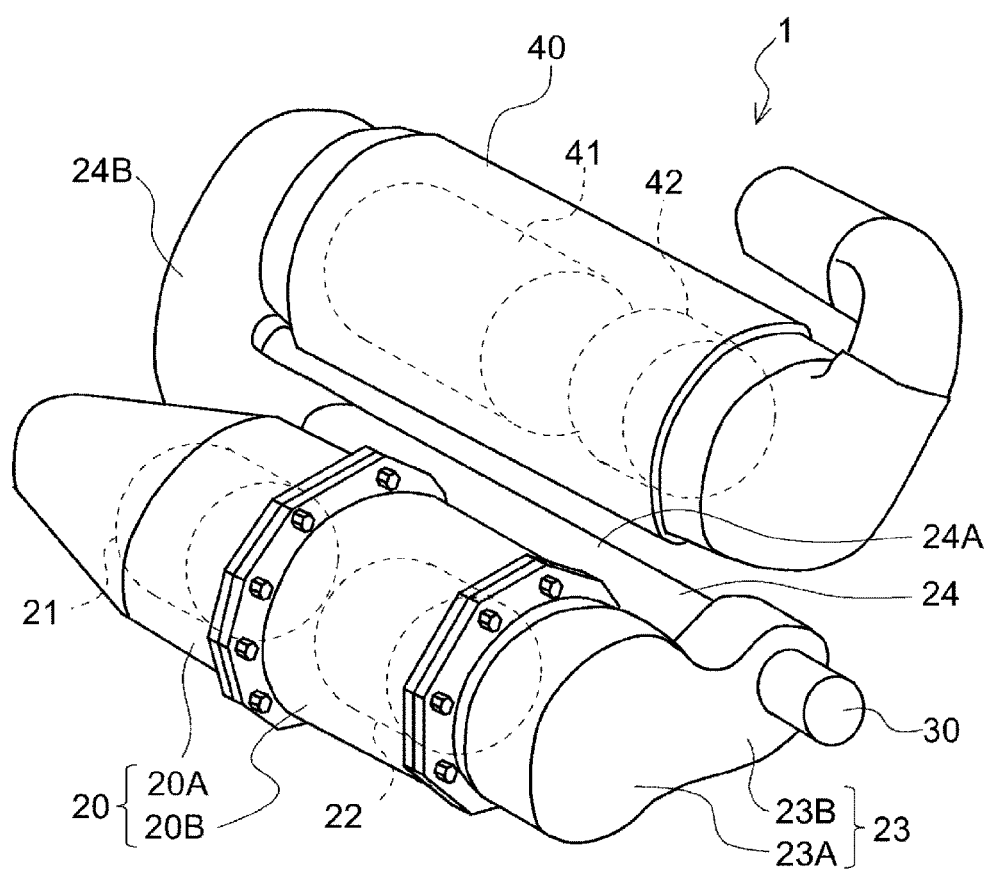
FIG. 1 is a perspective view depicting an exhaust purification unit in accordance with an illustrative embodiment.

Hereinafter, illustrative embodiments of the disclosure will be described with reference to the drawings. FIG. 1 is a perspective view depicting an exhaust purification unit 1 in accordance with an illustrative embodiment. As shown in FIG. 1, the exhaust purification unit 1 includes a front stage casing 20, a mixer chamber 23, a urea water injection valve 30, a connecting pipe 24 and a rear stage casing 40 in corresponding order from an exhaust upstream-side.

The front stage casing 20 and the rear stage casing 40 have a cylindrical shape, and are arranged in parallel so that both axis lines thereof are parallel with each other and are connected by the connecting pipe 24 arranged therebetween. The connecting pipe 24 has a cylindrical first pipe 24A and is arranged so that an axis line of the pipe 24A is parallel with the axis lines of the front stage casing 20 and the rear stage casing 40.

The front stage casing 20 has a first casing 20A and a second casing 20B coaxially arranged at an exhaust downstream-side of the first casing 20A. An exhaust downstream end of the first casing 20A and an exhaust upstream end of the second casing 20B are provided with annular flanges and both of the flanges are fastened by bolts and nuts. Also, a first oxidation catalyst 21 is accommodated in the first casing 20A, and a filter 22 is accommodated in the second casing 20B.

The first oxidation catalyst 21 is formed by, for example, carrying a catalyst component and the like on a surface of a ceramic carrier such as a cordierite honeycomb structure. The first oxidation catalyst 21 oxidizes unburnt hydrocarbon (HC) supplied by post injection or exhaust pipe injection, and thereby increases an exhaust temperature.

The filter 22 is formed by, for example, arranging a plurality of cells, which are divided by porous partition walls, along a flowing direction of exhaust and alternately plugging upstream and downstream sides of the cells. The filter 22 traps particulate matters (hereinafter, referred to as 'PM') in the exhaust in fine holes or surfaces of the partition walls, and when an estimated accumulation amount of the PM reaches a predetermined amount and so-called filter forced regeneration is implemented, the filter combusts and removes the PM. Herein, the filter forced regeneration is performed by supplying the unburnt hydrocarbon to the first oxidation catalyst 21 provided at the exhaust upstream-side through the exhaust pipe injection or post injection and increasing an exhaust temperature introduced to the filter 22 to a PM combustion temperature.

The mixer chamber 23 has a first chamber 23A arranged at an exhaust downstream end of the second casing 20B and having a circular arc-shaped side surface and a second chamber 23B extending from the side surface of the first chamber 23A towards the rear stage casing 40 and having a circular arc-shaped side surface. The first chamber 23A is arranged coaxially with the second casing 20B. Also, a diameter of the second chamber 23B is smaller than a diameter of the first chamber 23A and a boundary between the first and second chambers is curved into a circular arc shape.

The exhaust downstream end of the second casing 20B and an exhaust upstream end of the first chamber 23A are provided with annular flanges and both of the flanges are fastened by bolts and nuts.

The connecting pipe 24 has a cylindrical first pipe 24A connected to the second chamber 23B and a second pipe 24B connecting the first pipe 24A and an exhaust upstream end of the rear stage casing 40. The first pipe 24A is arranged coaxially with an injection axis of the urea water injection valve 30.

The second pipe 24B is an elbow pipe and an exhaust downstream end thereof has a circular disc shape. A linear part of the second pipe 24B is arranged coaxially with the first pipe 24A, and an exhaust downstream end of the first pipe 24A and an exhaust upstream end of the second pipe 24B are provided with annular flanges and both of the flanges are fastened by bolts and nuts. Also, an exhaust downstream end of the second pipe 24B and the exhaust upstream end of the rear stage casing 40 are provided with annular flanges and both of the flanges are fastened by bolts and nuts.

The urea water injection valve 30 is provided at the second chamber 23B. An injection axis of the urea water injection valve 30 is matched with an axis center of the connecting pipe 24, and urea water is injected (sprayed) from the urea water injection valve 30 towards an exhaust downstream-side of the connecting pipe 24.

In the connecting pipe 24, the urea water injected from the urea water injection valve 30 and exhaust gas flowing from the mixer chamber 23 towards the rear stage casing 40 are mixed, and the urea water is hydrolyzed due to exhaust heat, so that ammonia ($NH_3$) is generated. The generated ammonia is supplied to an SCR catalyst 41 provided at the exhaust downstream-side by the flow of the exhaust gas.

In the rear casing 40, the SCR catalyst 41 and a second oxidation catalyst 42 arranged at an exhaust downstream-side of the SCR catalyst 41 are accommodated.

The SCR catalyst 41 is formed by, for example, carrying zeolite or the like on a porous ceramic carrier. The SCR catalyst 41 adsorbs the ammonia, which is supplied from the urea water injection valve 30 as a reducing agent, and selectively reduces and purifies NOx in the passing exhaust with the adsorbed ammonia.

The second oxidation catalyst 42 is formed by, for example, carrying a catalyst component and the like on a surface of a ceramic carrier such as a cordierite honeycomb structure and has a function of oxidizing the ammonia having slipped from the SCR catalyst 41 towards the exhaust downstream-side.

Figure 2:
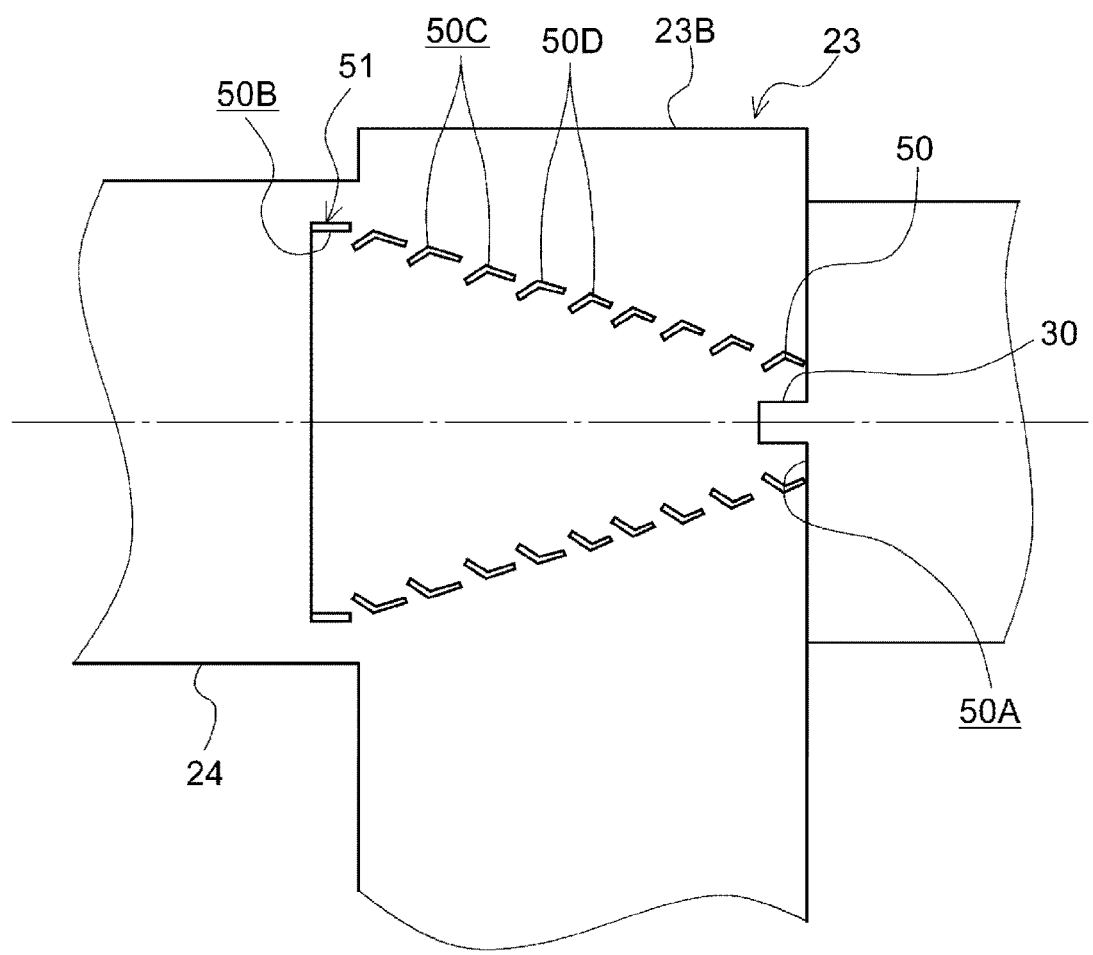
FIG. 2 is a sectional view depicting an inside of a mixer chamber and a connecting pipe.

FIG. 2 is a sectional view depicting an inside of the mixer chamber 23 and the connecting pipe 24. As shown in FIG. 2, a flow adjustment part 51 is provided in the chamber 23B of the mixer chamber 23 and a flow adjustment member 50 is provided at the flow adjustment part 51. The flow adjustment member 50 is a pipe material having a truncated-cone shape whose ends are both opened and is arranged coaxially with the urea water injection valve 30.

A small-diameter opening 50A of the flow adjustment member 50 is arranged to face an injection port of the urea water injection valve 30, and a large-diameter opening 50B of the flow adjustment member 50 is partially inserted in an upstream end of the connecting pipe 24. A gap through which the exhaust gas passes is provided between an outer peripheral surface of an edge portion of the opening 50B of the flow adjustment member 50 and an inner peripheral surface of the upstream end of the connecting pipe 24.

The flow adjustment member 50 is a porous member, in which rectangular small holes 50C are formed with narrow intervals in circumferential and axial directions. Herein, the small holes 50C are formed by cut-rising and bending processing, so that claws 50D are bent towards an inner side of the flow adjustment member 50 from upstream sides of the small holes 50C, which are starting points. A cut-rising and bending angle of the claw 50D is an acute angle and the claw 50D functions as a guide that guides the exhaust gas having passed through the small hole 50C towards the exhaust downstream-side.

Figure 3:
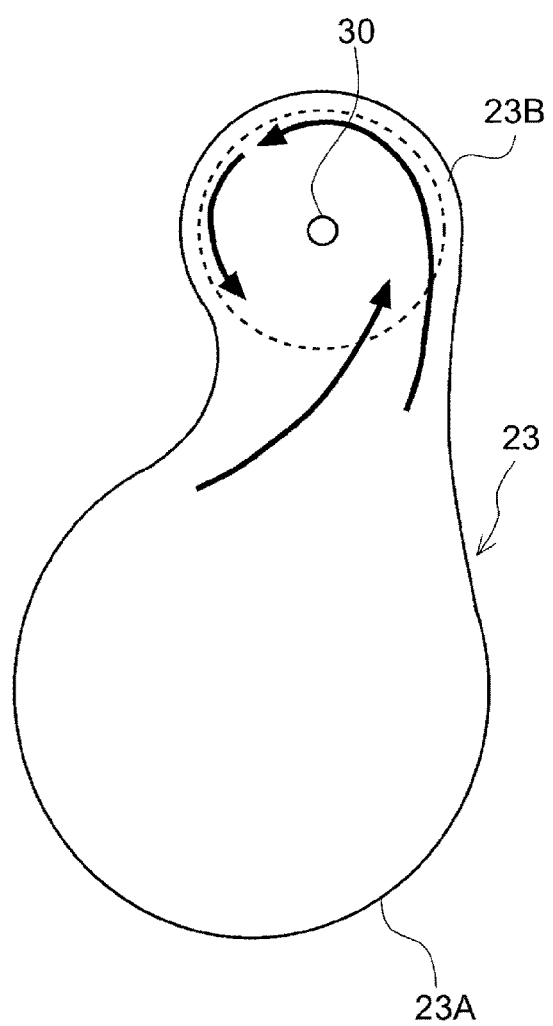
FIG. 3 depicts a flow of exhaust gas in the mixer chamber.
Figure 4:
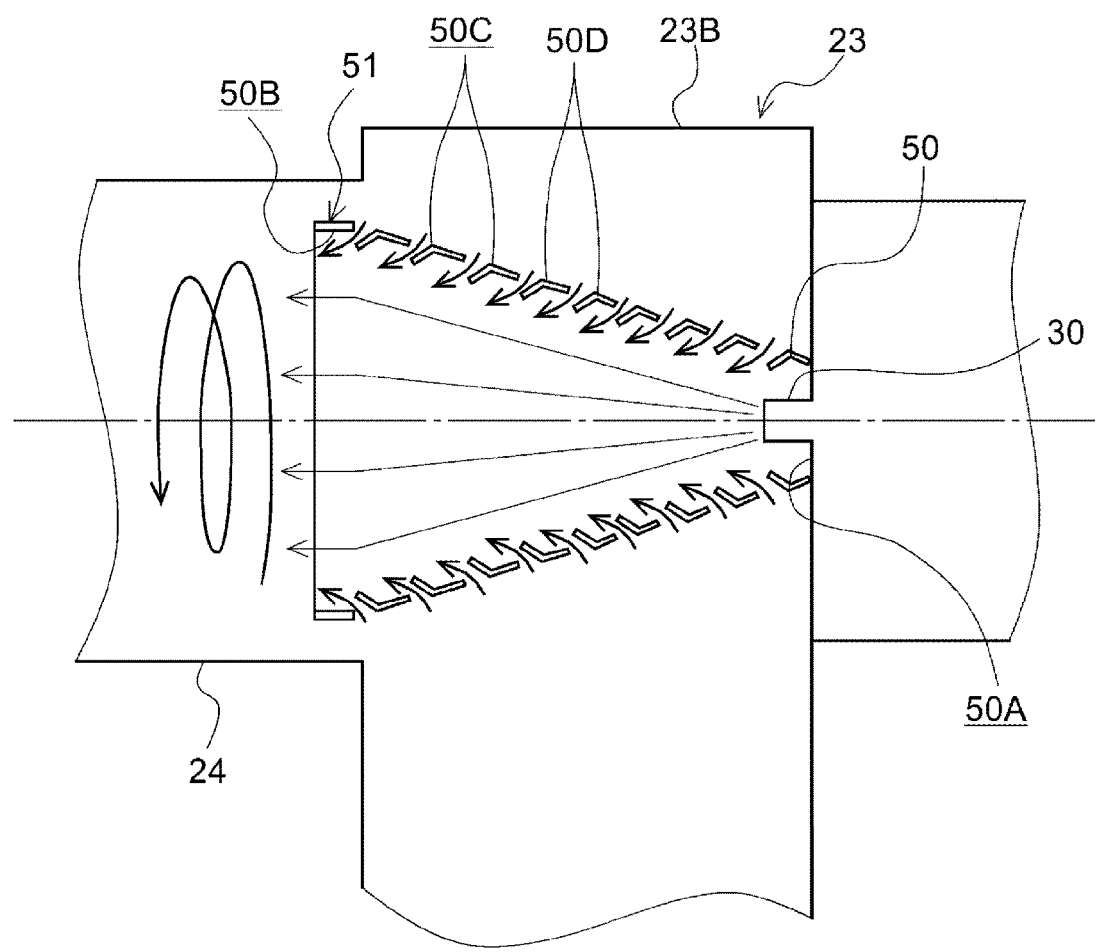
FIG. 4 depicts a flow of the exhaust gas in the mixer chamber.

FIGS. 3 and 4 depict flow of the exhaust gas in the mixer chamber 23. As shown in FIG. 3, a width of a flow path is narrowed from the first chamber 23A to the second chamber 23B and one sidewall (a left sidewall in FIG. 3) is curved and recessed, so that a swirl flow is generated in the exhaust gas flowing from the first chamber 23A to the second chamber 23B.

As shown in FIG. 4, the exhaust gas, which has become the swirl flow, passes through an outer side of the flow adjustment member 50 and flows into the connecting pipe 24, or passes through the small holes 50C and inside the flow adjustment member 50 and flows into the connecting pipe 24. In the connecting pipe 24, the exhaust gas flows towards the downstream-side while swirling about the axis center of the connecting pipe 24.

Herein, the urea water injection valve 30 injects the urea water into the flow adjustment member 50. The diameter of the flow adjustment member 50 is enlarged from the upstream-side towards the downstream-side, and the exhaust gas introduced from the small holes 50C is guided towards the exhaust downstream-side by the claws 50D, so that the injected (sprayed) urea water is diffused. Then, the diffused urea water and the exhaust gas, which has become the swirl flow, are mixed in the connecting pipe 24.

Thereby, after the urea water injected (sprayed) into the connecting pipe 24 is diffused, the urea water and the exhaust gas, which has become the swirl flow, can be mixed, so that it is possible to prevent the urea water from being attached to wall surfaces of the second chamber 23B and the connecting pipe 24 due to the flowing of the exhaust gas. Therefore, it is possible to improve a hydrolysis efficiency of the urea water.

Here, if the urea water is attached to the wall surface, the urea water is also hydrolyzed by the exhaust gas or heat of the wall surface, but diffusivity of ammonia in the connecting pipe 24 is lowered. In contrast, the flow adjustment part 51 of the illustrative embodiment can prevent the urea water from being attached to the wall surfaces of the second chamber 23B and the connecting pipe 24. Thus, it is possible to supply the exhaust gas of the swirl flow, in which ammonia has been uniformly diffused, to the SCR catalyst 41, so that it is possible to improve an exhaust gas purification capacity of the SCR catalyst 41.

Figure 5:
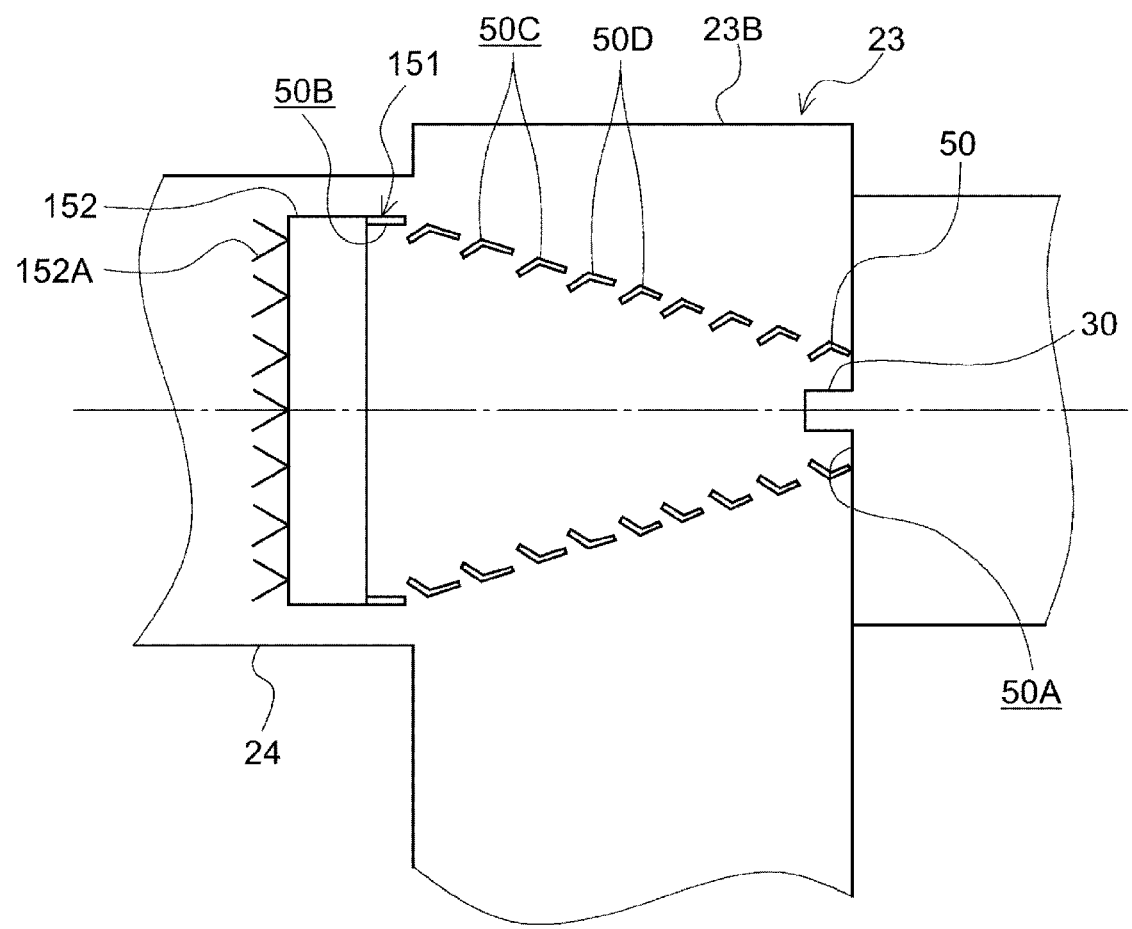
FIG. 5 is a sectional view depicting a flow adjustment part in accordance with another illustrative embodiment.

FIG. 5 is a sectional view depicting a flow adjustment part 151 in accordance with another illustrative embodiment. The same configurations as the illustrative embodiment are denoted with the same reference numerals and the descriptions thereof are omitted. As shown in FIG. 5, the flow adjustment part 151 includes the flow adjustment member 50 and a collision plate mixer 152 arranged at an exhaust downstream-side of the flow adjustment member 50. The collision plate mixer 152 is a circular ring-shaped frame body which is provided with a wire mesh (not shown) and a diffusion plate 152A. The collision plate mixer 152 is arranged towards the opening 50B in a vicinity of the downstream end of the flow adjustment member 50.

In the flow adjustment part 151 having the above configuration, the urea water injected from the urea water injection valve 30 and diffused by the flow adjustment member 50 collides with the wire mesh of the collision plate mixer 152. Thereby, the hydrolysis of the urea water is promoted. The urea water and the ammonia resulting from the hydrolysis are further diffused by the diffusion plate 152A and then flow into the connecting pipe 24.

Therefore, as compared to the exhaust purification unit having the above flow adjustment part 51, it is possible to further increase the hydrolysis efficiency of the urea water, thereby further improving the exhaust gas purification capacity of the SCR catalyst 41.

Figure 6:
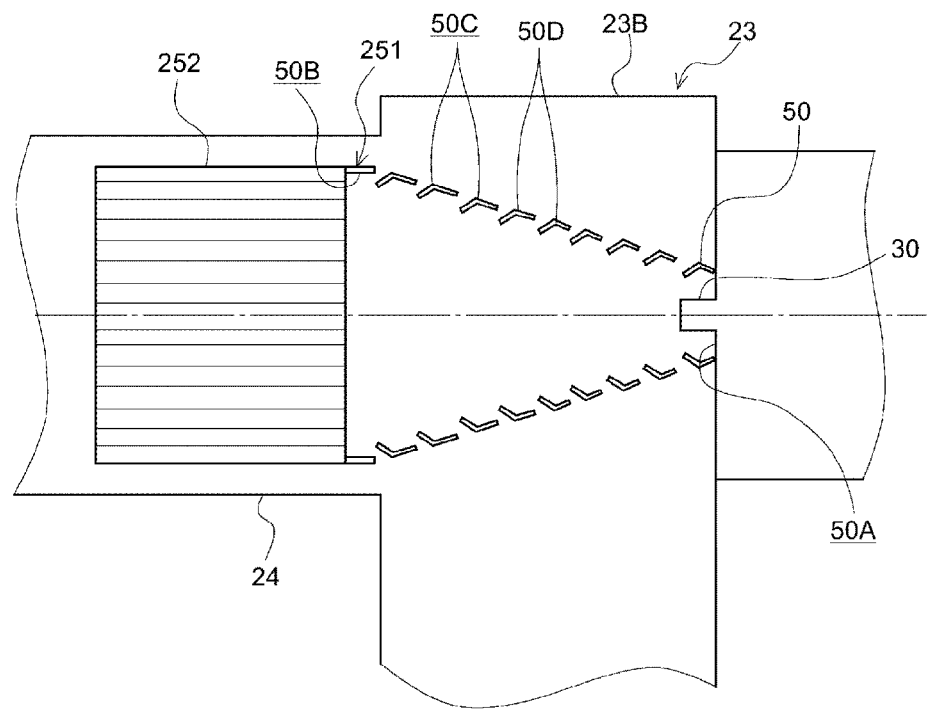
FIG. 6 is a sectional view depicting a flow adjustment part in accordance with another illustrative embodiment.

FIG. 6 is a sectional view depicting a flow adjustment part 251 in accordance with another illustrative embodiment. The same configurations as the illustrative embodiment are denoted with the same reference numerals and the descriptions thereof are omitted. As shown in FIG. 6, the flow adjustment part 251 includes the flow adjustment member 50 and a hydrolysis catalyst 252 arranged at the exhaust downstream-side of the flow adjustment member 50. As the hydrolysis catalyst 252, catalysts formed by, for example, carrying titanium oxide on a wall surface of a nitride silicon honeycomb or a metal honeycomb or carrying aluminum oxide on a wall surface of a cordierite honeycomb structure, and the like, can be used. The hydrolysis catalyst 252 is arranged towards the opening 50B in the vicinity of the downstream end of the flow adjustment member 50.

In the flow adjustment part 251 having the above configuration, the urea water injected from the urea water injection valve 30 and diffused by the flow adjustment member 50 passes through the hydrolysis catalyst 252. At this time, the hydrolysis of the urea water is promoted. The urea water and the ammonia resulting from the hydrolysis are transmitted towards the exhaust downstream-side of the connecting pipe 24 by exhaust gas, which has become the swirl flow.

Therefore, as compared to the exhaust purification unit having the above flow adjustment part 51, it is possible to further increase the hydrolysis efficiency of the urea water, thereby further improving the exhaust gas purification capacity of the SCR catalyst 41.

Figure 7:
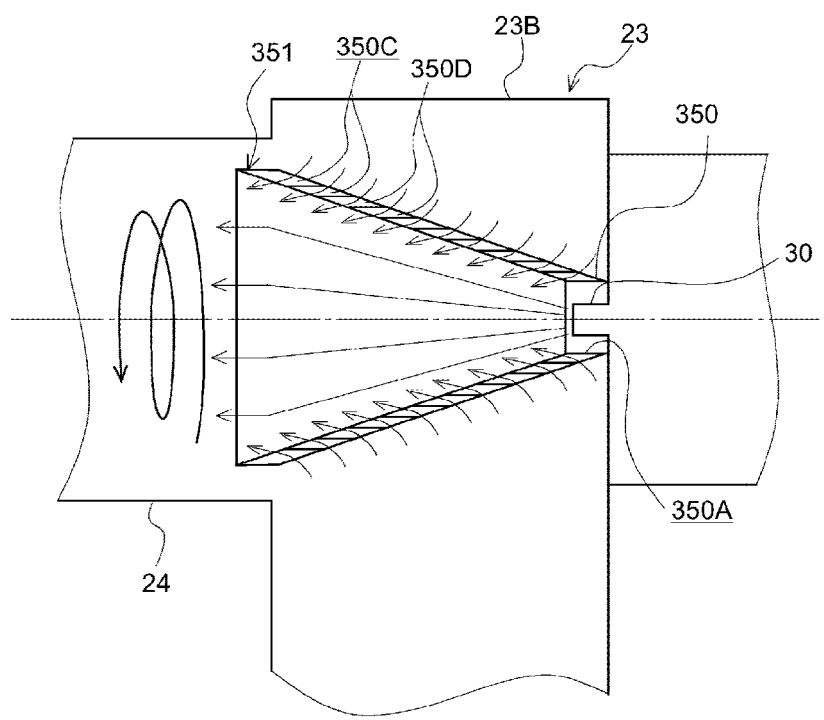
FIG. 7 is a sectional view depicting a flow adjustment part in accordance with another illustrative embodiment.

FIG. 7 is a sectional view depicting a flow adjustment part 351 in accordance with another illustrative embodiment. The same configurations as the illustrative embodiment are denoted with the same reference numerals and the descriptions thereof are omitted. As shown in FIG. 7, the flow adjustment part 351 is provided with a flow adjustment member 350. The flow adjustment member 350 is a pipe material having a truncated-cone shape whose ends are both opened, and is arranged coaxially with the urea water injection valve 30.

A small-diameter opening 350A of the flow adjustment member 350 is arranged to face the injection port of the urea water injection valve 30 and a large-diameter opening 350B of the flow adjustment member 350 is arranged to face the upstream end of the connecting pipe 24. A gap though which the exhaust gas passes is provided between an edge portion of the opening 350B of the flow adjustment member 350 and the upstream end of the connecting pipe 24 and between the edge portion of the opening 350B of the flow adjustment member 350 and the second chamber 23B.

The flow adjustment member 350 is a porous member, and is formed by molding a metal honeycomb into a truncated-cone shape. Rectangular small holes 350C are formed with narrow intervals in circumferential and axial directions. Herein, partition walls 350D of the metal honeycomb are inclined relative to a thickness direction of the metal honeycomb and are arranged in parallel with an axis center of the flow adjustment member 350. Thereby, the partition wall 350D functions as a guide that guides the exhaust gas having passed through the small hole 350C towards the exhaust downstream-side.

Like the flow adjustment part 51, in the flow adjustment part 351 having the above configuration, a diameter of the flow adjustment member 350 is enlarged from the upstream-side towards the downstream-side and the exhaust gas introduced from the small holes 350C is guided towards the exhaust downstream-side by the partition walls 350D, so that the injected (sprayed) urea water is diffused. The diffused urea water and the exhaust gas, which has become the swirl flow, are mixed in the connecting pipe 24.

Figure 8:
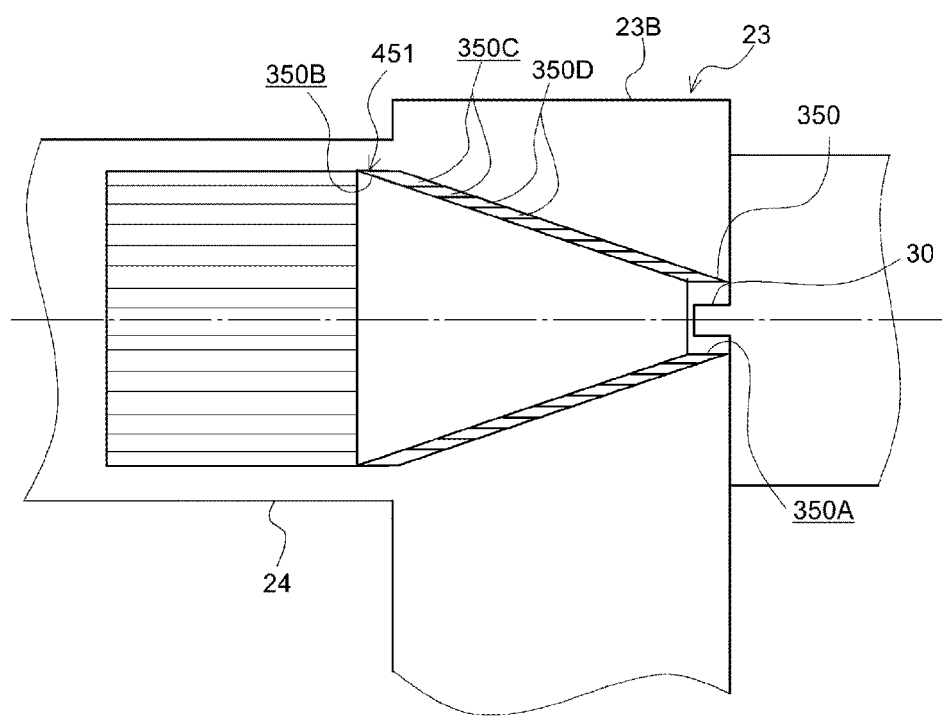
FIG. 8 is a sectional view depicting a flow adjustment part in accordance with another illustrative embodiment.

FIG. 8 is a sectional view depicting a flow adjustment part 451 in accordance with another illustrative embodiment. The same configurations as the illustrative embodiment are denoted with the same reference numerals and the descriptions thereof are omitted. As shown in FIG. 8, the flow adjustment part 451 includes the flow adjustment member 350 and a hydrolysis catalyst 252 arranged at an exhaust downstream-side of the flow adjustment member 350.

Like the flow adjustment part 251, in the flow adjustment part 451 having the above configuration, the urea water injected from the urea water injection valve 30 and diffused by the flow adjustment member 350 passes through the hydrolysis catalyst 252. At this time, the hydrolysis of the urea water is promoted. The urea water and the ammonia resulting from the hydrolysis are sent towards the exhaust downstream-side of the connecting pipe 24 by the exhaust gas, which has become the swirl flow.

Figure 9:
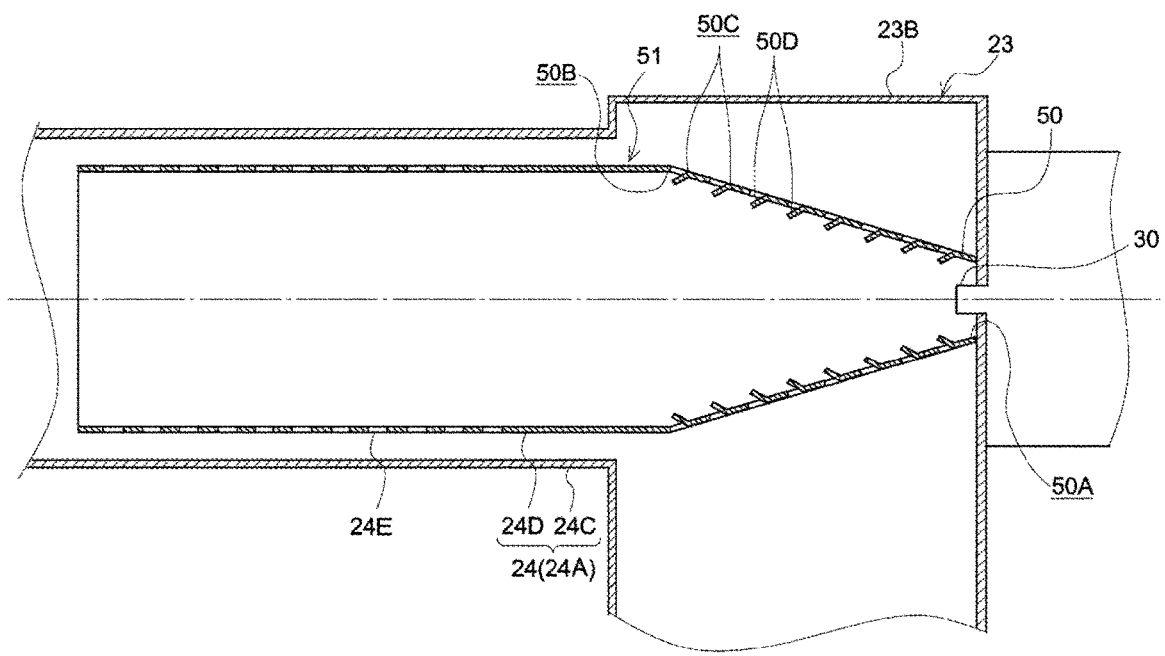
FIG. 9 is a sectional view depicting an inside of a mixer chamber and a connecting pipe in accordance with another illustrative embodiment.

FIG. 9 is a sectional view depicting an inside of the mixer chamber 23 and the connecting pipe 24 in accordance with another illustrative embodiment. The same configurations as the illustrative embodiment are denoted with the same reference numerals and the descriptions thereof are omitted. As shown in FIG. 9, the first pipe 24A of the connecting pipe 24 of this illustrative embodiment is a double pipe structure, and has a cylindrical outer pipe 24C linearly extending from an exhaust upstream end of the first pipe 24A to the exhaust downstream end and a cylindrical inner pipe 24D linearly extending from the exhaust upstream end of the first pipe 24A towards the exhaust downstream-side. The inner pipe 24D is provided at the downstream-side of the flow adjustment member 50. In this illustrative embodiment, an exhaust upstream end of the inner pipe 24D and the exhaust downstream end of the flow adjustment member 50 have the same diameter and are joined to each other. Thereby, the exhaust gas flowing outside the flow adjustment member 50 passes between the outer pipe 24C and the inner pipe 24D and flows towards the exhaust downstream-side.

An opening is not formed at a part of an exhaust upstream-side of the inner pipe 24D, and the exhaust gas does not flow in and out of the inner pipe 24D at the corresponding part. On the other hand, a plurality of small holes 24E is formed in a predetermined range at a part of the exhaust downstream-side of the inner pipe 24D with narrow intervals in circumferential and axial directions, and the exhaust gas flows in and out of the inner pipe 24D.

Figure 10:
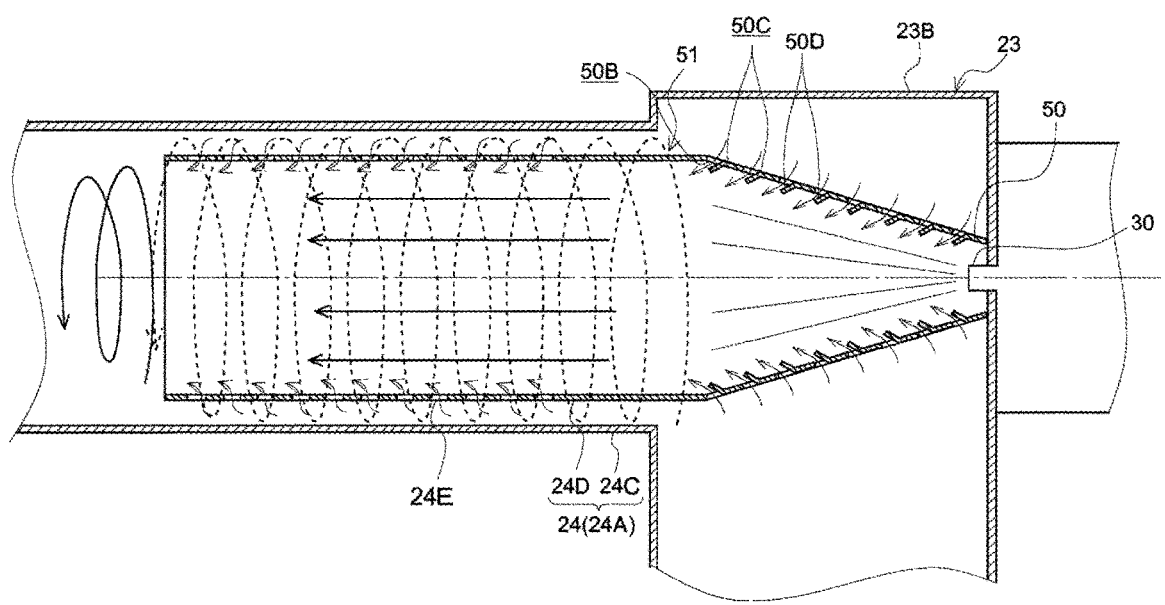
FIG. 10 depicts a flow of exhaust gas in the mixer chamber and the connecting pipe in accordance with another illustrative embodiment.

FIG. 10 depicts flow of the exhaust gas in the mixer chamber 23 and the connecting pipe 24. As shown in FIG. 10, the exhaust gas, which has become the swirl flow, passes through the outer side of the flow adjustment member 50 and flows between the outer pipe 24C and the inner pipe 24D of the connecting pipe 24 or passes through the small holes 50C and inside the flow adjustment member 50 and flows into the connecting pipe 24. In the connecting pipe 24, the exhaust gas flows towards the downstream-side while swirling about the axis center of the connecting pipe 24. The exhaust gas flowing between the outer pipe 24C and the inner pipe 24D passes through the small holes 24E at an exhaust downstream-side of the double pipe structure part and is introduced into the inner pipe 24D.

The urea water injection valve 30 injects the urea water into the flow adjustment member 50. The diameter of the flow adjustment member 50 is enlarged from the upstream-side towards the downstream-side and the exhaust gas introduced from the small holes 50C is guided towards the exhaust downstream-side by the claws 50D, so that the injected (sprayed) urea water is diffused. Then, the diffused urea water and the exhaust gas, which has become the swirl flow, are mixed in the connecting pipe 24. Thereby, after diffusing the urea water injected (sprayed) into the connecting pipe 24, it is possible to mix the urea water and the exhaust gas, which has become the swirl flow.

Herein, in the connecting pipe 24, the exhaust gas flows between the outer pipe 24C and the inner pipe 24D, so that the exhaust gas flowing in the inner pipe 24D is heated. Thereby, it is possible to suppress temperature drop of the exhaust gas due to latent heat upon the hydrolysis of the urea water, so that it is possible to improve the conversion efficiency from the urea water to the ammonia, thereby improving the NOx conversion efficiency of the SCR catalyst 41.

Also, it is possible to prevent the urea water from being attached to the wall surfaces of the second chamber 23A and the connecting pipe 24 due to the flowing of the exhaust gas, so that it is possible to increase the hydrolysis efficiency of the urea water and to improve the diffusivity of ammonia in the connecting pipe 24.

Furthermore, the exhaust gas flowing between the outer pipe 24C and the inner pipe 24D at the exhaust downstream-side of the double pipe structure part is introduced into the inner pipe 24D and the ammonia or the urea water is mixed with the diffused exhaust gas, so that it is possible to further improve the diffusivity of ammonia in the exhaust gas.

In the illustrative embodiment, the inner pipe 24D of the first pipe 24A having the double pipe structure is provided at the downstream-side of the flow adjustment member 50. Likewise, the inner pipe 24D of the first pipe 24A having the double pipe structure may be provided at the downstream-side of the flow adjustment member 350.

The disclosure is not limited to the above illustrative embodiments and appropriate modifications can be made without departing from the spirit of the disclosure.

The subject application is based on a Japanese Patent Application No. 2015-068050 filed on Mar. 30, 2015 and a Japanese Patent Application No. 2015-085716 filed on Apr. 20, 2015, the contents of which are incorporated herein by reference.

INDUSTRIAL APPLICABILITY

The exhaust purification unit of the disclosure is useful, in that it is possible to improve the exhaust gas purification capacity of the catalyst by increasing the hydrolysis efficiency of the urea water and improving the diffusivity of ammonia in the exhaust gas.

REFERENCE SIGNS LIST

1: exhaust purification unit, 20: front stage casing, 20A: first casing
20B: second casing, 21: first oxidation catalyst, 22: filter
23: mixer chamber, 23A: first chamber, 23B: second chamber
24: connecting pipe, 24A: first pipe, 24B: second pipe
24C: outer pipe, 24D: inner pipe, 24E: small hole
30; urea water injection valve, 40: rear stage casing, 41: SCR catalyst
42: second oxidation catalyst, 50: flow adjustment member
50A: opening, 50B: opening, 50C: small hole, 50D: claw
51: flow adjustment part, 151: flow adjustment part, 152: collision plate mixer
152A: diffusion plate, 251: flow adjustment part, 252: hydrolysis catalyst
350: flow adjustment member, 350A: opening, 350B: opening
350C: small hole, 350D: partition wall, 351: flow adjustment part
451: flow adjustment part

The invention claimed is:

1. An exhaust purification unit comprising:
a selective reduction catalyst provided in an exhaust system of an internal combustion engine and selectively reducing a nitrogen oxide in exhaust by using ammonia as a reducing agent;
an exhaust pipe transmitting exhaust gas to the selective reduction catalyst;
a urea water injection device arranged to face an exhaust upstream end of the exhaust pipe and injecting urea water into the exhaust pipe;
a mixer chamber that includes: a first chamber connecting an exhaust downstream end of a casing that accommodates therein a catalyst and a second chamber connecting a downstream-side of the first chamber and also connecting the exhaust upstream end of the exhaust pipe, and that forms a flow path along which the exhaust gas flows from the casing and turns back to the exhaust pipe; and
a flow adjustment member provided in the second chamber, being a pipe material having a truncated-cone shape which extends from a vicinity of an injection port of the urea water injection device towards the exhaust pipe with a diameter thereof gradually increasing, in which a plurality of ventilation holes is formed on an inclined surface of the truncated-cone shape with predetermined intervals in an axial direction of the flow adjustment member from an exhaust upstream end of the flow adjustment member to an exhaust downstream end of the flow adjustment member, and in which a guide, provided in the second chamber, that guides the exhaust gas towards an exhaust downstream-side is provided to the inclined surface for each of the plurality of ventilation holes,
wherein each guide extends towards an inner side of the flow adjustment member from the exhaust upstream end of each of the plurality of ventilation holes, each guide formed along a bend line at the exhaust upstream end of the each of the plurality of ventilation holes, each bend line extending in a circumferential direction of the flow adjustment member,
wherein the flow adjustment member comprises a first end and a second end, the first end comprising an opening having a larger diameter than the second end, the first end of the flow adjustment member is partially inserted in the exhaust upstream end of the exhaust pipe so to overlap with the exhaust pipe along a radial direction of the flow adjustment member, and a gap, through which the exhaust gas passes, is provided at the overlap and between an outer peripheral surface at an edge portion of the first end of the flow adjustment member and an inner peripheral surface at the upstream end of the exhaust pipe,
wherein the first chamber has a first circular arc-shaped side surface having a first radius,
wherein the second chamber has a second circular arc-shaped side surface having a second radius smaller than the first radius, and
wherein a width of a flow path is narrowed from the first chamber to the second chamber, and one sidewall of the mixer chamber is curved and recessed such that the width of the flow path, where the one sidewall is recessed, is narrower than the second radius.

2. The exhaust purification unit according to claim 1, further comprising a porous material arranged at the exhaust downstream end of the flow adjustment member.

3. The exhaust purification unit according to claim 1, further comprising a hydrolysis catalyst arranged at the exhaust downstream end of the flow adjustment member.

4. The exhaust purification unit according to claim 1,
wherein the exhaust pipe includes an inner pipe to which the urea water is injected from the urea water injection device and an outer pipe forming a double pipe structure together with the inner pipe, and
wherein a flow path of the exhaust gas is formed inside the inner pipe and between the inner pipe and the outer pipe.

5. An exhaust purification unit comprising:
a selective reduction catalyst provided in an exhaust system of an internal combustion engine and selectively reducing a nitrogen oxide in exhaust by using ammonia as a reducing agent;
an exhaust pipe transmitting exhaust gas to the selective reduction catalyst;
a urea water injection device injecting urea water into the exhaust pipe;
a mixer chamber that includes: a first chamber connecting an exhaust downstream end of a casing that accommodates therein a catalyst; and a second chamber connecting a downstream-side of the first chamber and also connecting the exhaust upstream end of the exhaust pipe, and that forms a flow path along which the exhaust gas flows from the casing and turns back to the exhaust pipe; and
a flow adjustment member connected to the exhaust pipe and having a plurality of first ventilation holes formed therein,
wherein the exhaust pipe includes an inner pipe to which the urea water is injected from the urea water injection device and an outer pipe forming a double pipe structure together with the inner pipe, wherein the inner pipe is overlapped with the outer pipe in an axial direction, and a flow path of the exhaust gas is formed inside the inner pipe and between the inner pipe and the outer pipe, wherein the flow adjustment member is connected to an exhaust upstream end of the inner pipe and is formed to have a truncated-cone shape which extends from a vicinity of an injection port of the urea water injection device to the exhaust upstream end of the inner pipe with a diameter thereof gradually increasing, wherein the plurality of the first ventilation holes is formed on an inclined surface of the truncated-cone shape with predetermined intervals in an axial direction of the flow adjustment member from an exhaust upstream end of the flow adjustment member to an exhaust downstream end of the flow adjustment member, wherein a guide, provided in the second chamber, that guides the exhaust gas towards an exhaust downstream-side is provided to the inclined surface for each of the plurality of first ventilation holes, wherein each guide extends towards an inner side of the flow adjustment member from the exhaust upstream end of each of the plurality of ventilation holes, each guide formed along a bend line at the exhaust upstream end of the each of the plurality of ventilation holes, each bend line extending in a circumferential direction of the flow adjustment member, wherein the inner pipe and the outer pipe share a common cross-sectional shape, and wherein a plurality of second ventilation holes is formed at a part of an exhaust downstream-side of the inner pipe with predetermined intervals in a circumferential direction and the axial direction of the inner pipe, wherein the flow adjustment member comprises a first end and a second end, the first end comprising an opening having a larger diameter than the second end, and wherein the plurality of second ventilation holes is formed at the part on the exhaust downstream-side of the inner pipe that overlaps at least with the outer pipe in a radial direction of the inner pipe, and a gap, through which the exhaust gas passes, is provided at the overlap and between the outer pipe and the inner pipe of the exhaust pip;

wherein the first chamber has a first circular arc-shaped side surface having a first radius, wherein the second chamber has a second circular arc-shaped side surface having a second radius smaller than the first radius, and wherein a width of a flow path is narrowed from the first chamber to the second chamber, and one sidewall of the mixer chamber is curved and recessed such that the width of the flow path, where the one sidewall is recessed, is narrower than the second radius.

6. The exhaust purification unit according to claim 1, wherein the exhaust pipe is arranged such that an axis line of the exhaust pipe is parallel with the axis line of the casing.

7. The exhaust purification unit according to claim 5, wherein the exhaust pipe is arranged such that an axis line of the exhaust pipe is parallel with the axis line of the casing.

8. The exhaust purification unit according to claim 1, wherein the flow path is formed between the one sidewall and another sidewall for the mixer chamber, wherein the one sidewall is asymmetrical with respect to the another sidewall such that a radius of curvature of the one sidewall is smaller than a radius of curvature of the another sidewall of the mixer chamber and the one sidewall is recessed further into the flow path than the another sidewall.

* * * * *